United States Patent [19]

Mueller

[11] 4,325,850

[45] Apr. 20, 1982

[54] PROCESSING AND PRODUCT ENHANCEMENT ADDITIVES FOR POLYOLEFIN FILM

[75] Inventor: Walter B. Mueller, Taylors, S.C.

[73] Assignee: W. R. Grace & Co., Duncan, S.C.

[21] Appl. No.: 40,793

[22] Filed: May 21, 1979

[51] Int. Cl.³ ................. C08L 23/00; C08L 23/06; C08L 23/16

[52] U.S. Cl. .................... 524/228; 524/143

[58] Field of Search ........ 260/32.6 PQ, 23 H, 28.5 A, 260/31.8 PQ, 31.6

[56] References Cited

U.S. PATENT DOCUMENTS

| | | | |
|---|---|---|---|
| 3,009,900 | 11/1961 | Hansen | 260/45.75 R |
| 3,165,492 | 1/1965 | Tholstrup et al. | 260/32.6 PQ |
| 3,226,437 | 12/1965 | Anspon et al. | 260/32.6 PQ |
| 3,309,338 | 3/1967 | Schullin | 260/23 XA |
| 3,470,122 | 9/1969 | Ridgeway et al. | 260/32.6 PQ |
| 3,536,796 | 10/1970 | Rock | 264/49 |
| 3,553,158 | 1/1971 | Gilfillan | 260/41 R |
| 3,595,776 | 7/1971 | Davidson et al. | 208/14 |
| 3,595,827 | 7/1971 | Foster | 260/42.52 |
| 3,627,625 | 12/1971 | Jarrett | 161/165 |
| 3,645,822 | 2/1972 | Widiger et al. | 260/32.6 PQ |
| 3,665,068 | 5/1972 | Duling et al. | 260/28.5 A |
| 3,694,403 | 9/1972 | Aishima et al. | 260/41 R |
| 3,763,082 | 10/1973 | Elliott | 260/37 N |
| 3,903,234 | 9/1975 | Ikeda et al. | 264/210 R |
| 3,966,857 | 6/1976 | Charlton et al. | 264/75 |
| 3,969,304 | 7/1976 | Pugh et al. | 260/32.6 PQ |
| 3,980,611 | 9/1976 | Anderson et al. | 260/37 N |
| 4,086,301 | 4/1978 | Zerpner et al. | 260/23 H |

*Primary Examiner*—Ronald W. Griffin
*Attorney, Agent, or Firm*—John J. Toney; William D. Lee, Jr.; Joseph P. Harps

[57] ABSTRACT

Polyolefin film is produced with enhanced properties by the addition thereto of a placticizing oil, a slip promoting wax and an inert filler for imparting anti-block characteristics to the film. The three components have a synergistic effect in that the combination enhances the desirable attributes of each additive while minimizing the deleterious effects which each additive alone would have on a polyolefin film.

9 Claims, No Drawings

PROCESSING AND PRODUCT ENHANCEMENT ADDITIVES FOR POLYOLEFIN FILM

BACKGROUND OF THE INVENTION

This invention relates generally to the art of polyolefin films and more particularly to the art of polyolefin film with additives for enhancing slip and block characteristics.

The term polyolefin as it relates to films within this disclosure is meant to include normally solid polymers of the 1-mono-olefins as well as copolymers and ionomers thereof. Films of such polyolefins have a tendency to block upon being wound into rolls. The term "blocking" as used herein refers primarily to the tendency of films or sheets of the polyolefin film to stick or adhere to each other or to other surfaces when such adhesion is otherwise undesirable. When the film is rolled for purposes of storage or shipment, any tendency of the contacting surfaces to block results in breaks, tears and marred surfaces as the rolls are unwound. Similar effects are noted when stacked sheets are pulled apart. The tendency of sheets and rolls of film to block even slightly renders impossible their use in mechanical packaging or wrapping equipment. Blocking results in uneven tension of the film during wrapping, leading to excessive film breakage, unsightly packages, or marred surfaces on the film. The problem of blocking is well recognized by the polyolefin film industry which has provided a standard test therefor by way of ASTM D 1894 which is a technique for determining the coefficient of friction between adjacent film layers.

A technique for reducing the blocking tendency of polyolefin films is the incorporation within the film of an inert particulate filler which has the effect of roughening the surface of the film and thereby significantly lessening the contact area between adjacent layers. Such materials include colloidal silica, diatomaceous earth, clays, aluminum oxide, calcium oxide, magnesium oxide, barium oxide, titanium dioxide, iron oxide, zinc oxide, tin oxide, calcium carbonate, magnesium carbonate, mica, asbestos, calcium silicate, molybdenum disulfide and zinc sulfide.

Another technique for preventing adhesion in wound polyolefin products is the incorporation of slip agents in the film composition prior to film formation. Slip agents are modifiers used in a plastic to provide surface lubrication during and immediately after processing. These agents are added to the plastic during processing and given internal and external lubrication. They have limited compatibility with the film composition and are designed to exude to the film surface and provide an invisible coating on the plastic; thus reducing the coefficient of friction. The primary function of such an additive is to reduce the sticking of the film to itself by minimizing tack.

A major shortcoming, however, of both slip agents and antiblock agents is the adverse effect which each have upon the optical properties and processability of polyolefin film.

SUMMARY OF THE INVENTION

It is thus an object of this invention to provide additives for producing a polyolefin film which reduces the blocking tendency without adversely affecting the optical properties of the resulting film.

It is a further object to provide such additives for use with both monolayer and multilayer film products.

It is a still further object of this invention to provide a process of producing polyolefin film products with improved slip and block characteristics without adversely affecting the processability of the film forming composition.

These as well as other objects are accomplished by providing with an anti-blocking agent and a slip agent a plasticizing oil within the film forming composition. The combination of the three additives provides not only a reduced blocking tendency but also an improvement in optical quality over a film product not having all three additives. The three additives additionally provide an unexpected result in that increased amounts of both anti-blocking agents and slip agents may be provided while retaining processability when a plasticizing oil is added in combination therewith.

DETAILED DESCRIPTION

In accordance with this invention it has been found that the combination of an anti-block agent, a slip agent and a plasticizing oil as an additive to polyolefin film exhibits a synergistic effect in that the anti-block agent and slip agent may be utilized without adversely affecting the optical characteristics of the resulting polyolefin film. An unexpected advantage of the combination is the surprising decrease in the coefficient of friction when an anti-block agent and a slip agent are added in combination with a plasticizing oil. It has additionally and surprisingly been found that the level of anti-block and slip agent which may be incorporated into a polyolefin film is substantially increased when added in combination with a plasticizing oil.

In accordance with this invention, the particulate fillers which have been utilized within the prior art as anti-blocking agents are useful also in this invention. Thus, the materials listed in the background of the invention are contemplated for use within the scope of this invention. Preferably, however, silica particles in the form of diatomaceous earth origin are preferred. The anti-blocking agent in accordance with this invention may be incorporated into the polyolefin film in an amount from 500 to 5,000 ppm by weight.

Slip agents in accordance with this invention can be any of the waxes heretofore utilized as slip agents within the prior art. Such waxes may be of petrolem origin or synthetic origin. The preferred wax utilized as a slip agent in accordance with this invention is a bisamide wax. Standard waxes other than bisamide waxes such as amide, erucamide, and oleamide waxes cause a loss in the optical quality of the resulting film which is not compensated for by the addition of the plasticizing oil of this invention.

It has been surprisingly found that when a slip agent in the form of a wax is added in combination with an oil having plasticizing characteristics, the level of wax which can be added without losing processability is significantly greater than that which can be added without the addition of a plasticizing oil. This aspect of the invention is more noticeable with thinner film than with thicker films and significantly more apparent with multilayer film than with single layer film. Thus, for a given film thickness a higher concentration of wax may be added in combination with a plasticizing oil than may be added without such plasticizing oil. In accordance with this invention it is possible to add such a wax in effective amounts from about 500 to 8,000 ppm.

The plasticizing oil, in accordance with this invention, may be an oil selected from the group of dibutyl sebacate, di-isododecyl phthalate, zinc stearate, stearic acid, polyethylene glycol monostearate, polyethylene glycol distearate, epoxidized vegetable oil, tricresyl phosphate, petroleum oil, paraffin oil, tall oil, linseed oil, and liquid petrolatum. The preferred plasticizing oil for use in accordance with this invention is liquid petrolatum or as it is otherwise referred to heavy mineral oil. It has been found that the use of a plasticizing oil in combination with a slip agent and anti-block agent, in accordance with this invention, prevents a deleterious effect on the optical quality of the resulting film. Without a plasticizing oil, an anti-blocking agent normally increases the haze of a polyolefin film. However, when added in combination with a plasticizing oil, in accordance with this invention the haze of the film does not exhibit an increase but to the contrary in some instances exhibits a decrease.

Waxes, which are utilized to improve the slip characteristics of polyolefin film, normally cause a decrease in the gloss of the film. When a wax was is added in combination with a plasticizing oil in accordance with this invention the gloss increases in comparison to a film without the plasticizing oil of this invention. This also is more apparent in multi-layer film than in monolayer film.

The plasticizing oil in accordance with this invention is added in an amount from about 250 to about 40,000 ppm weight in an amount effective to enhance the effects of the slip and anti-block additives and in an amount sufficient to plasticize the polyolefin.

It has been found that optimum ranges for the combination of additives are from 1,000 to 3,000 ppm plasticizing oil; 1,000 to 3,000 ppm slip agent; and 1,000 to 2,000 ppm anti-block agent.

The polyolefin films useful in this invention include those referred to in the backgrund section and particularly include normally solid polymers of ethylene of low, medium and high density, propylene; copolymers of ethylene and propylene; copolymers of ethylene, propylene and butylene; and copolymers of ethylene and vinyl acetate. The polyolefin film of this particular invention may be either in the crosslinked or uncrosslinked form. Such crosslinking is well known to the art and is described for example in U.S. Pat. No. 3,144,399 to W. C. Rainer et al.

While some reference has been made in the description of this invention to monolayer and multi-layer films, the invention is equally applicable to both such film classifications. The beneficial effects of this invention are more apparent on multi-layer film than on monolayer film, however. The effects on optical characteristics are significantly more pronounced on multi-layer film than on monolayer film. Monolayer film, however, exhibits a synergistic enhancement of the anti-blocking characteristics when the three additives are utilized simultaneously. Multi-layer film, however, exhibits increased processability as well as improved optic and enhanced anti-block characteristics when the additives of this invention are utilized.

Multi-layer films, in accordance with this invention, generally require that the slip additive and plasticizing oil additive be utilized within all layers while only the outer layers require the anti-block additive. The layers other than the outer layers in a multi-layer film require the presence of the slip additive and plasticizing oil additive to both improve the optical quality and to prevent migration of the slip and plasticizing oil additives from the outer layer to the inner layer, resulting in a net loss of such additives in the outer layers.

The film product produced by this invention is surprisingly printable utilizing either rotogravure or flexographic techniques. It is preferred to utilize corona treatment prior to printing. Prior to the invention herein disclosed, it was felt that film containing either slip promoting waxes were generally non-printable due to the lack of adhesion on the wax surface. This also was considered to be true for film containing an oil which exuded to the surface. However, with this invention utilizing a plasticizing oil, a slip promoting wax and an inert filler for antiblock characteristics, the resulting film is printable. While not wishing to be bound by the following, it is felt that the addition of the inert filler gives the surface sufficient roughness to promote adhesion even when slip promoting waxes and plasticizing oils are present.

Having generally described the process for preparing the polyolefin films of this invention, the following specific examples are given as a further illustration of the implementation of this invention.

EXAMPLE I

An ethylene propylene copolymer film having compositions specified in the following table was prepared by ribbon blending the additives with the copolymer resin prior to extrusin. The blended components were extruded thrugh a six inch 20:1 L/D extruder maintained at a temperature of 370° to 380° F. and formed into a cylidrical tape through a five inch die maintained at a temperature of 370° F. The tape was biaxially oriented by the trapped bubble technique, utilizing a stretch ratio of 4.8 to 1 in both the longitudinal and transverse directions. The tape had a thickness of about 17 mils prior to orientation. The following ASTM techniques were utilized in determining the data of Table I.

| Test | ASTM Number |
|---|---|
| Gardener Clarity | D1746-70 |
| Haze | D1003-61 |
| Total Transmission | D1003-61 |
| Gloss | D2457-70 |
| Coefficient of Friction | D1897-73 |

TABLE I

| Identifying No. | 0074 | 0079 | 0081 | 0082 | 0083 | 0086 |
|---|---|---|---|---|---|---|
| Mineral Oil (PPM) | 3000 | 0 | 3000 | 0 | 3000 | 0 |
| Bisamide Wax (PPM) | 3000 | 3000 | 3000 | 0 | 0 | 0 |
| Diatomaceous Earth (PPM) | 1000 | 0 | 0 | 1000 | 1000 | 0 |
| Haze | 2.2 | .8 | .6 | .6 | .8 | 2.5 |
| Gloss | 87 | 85 | 87 | 92 | 90 | 87 |
| Total Transmission | 92.4 | 92.6 | 92.7 | 92.7 | 92.6 | 92.2 |
| Clarity | 71 | 73.6 | 84.7 | 85.1 | 76.5 | 71.8 |
| COF Static in/in | .395 | .896 | .820 | 1.215 | .600 | .823 |
| out/out | .368 | 1.077 | 1.229 | .941 | .508 | 1.851 |
| Kinetic in/in | .378 | .635 | .505 | blocked | .528 | .670 |
| out/out | .320 | .575 | blocked | blocked | .473 | blocked |
| Thickness (Mils) | 0.87 | 0.98 | 0.85 | 0.85 | 0.83 | 0.92 |

The aspect of principal significance in the above table is the coefficient of friction data. When diatomaceous earth, wax, and mineral oil are utilized together, the coefficient of friction is significantly less than when any one or two of the other two additives are utilized alone. It is also noted that the additives do not cause a loss in the optical quality of the film as compared to the film sample containing no additives.

EXAMPLE II

A five layer film was produced by coextrusion under conditions substantially similar to those specified in Table I. The coextruded structure had the layers and thicknesses specified below.

| | |
|---|---|
| Layer 1 Propylene Ethylene Copolymer | Thickness - 3.5 mils |
| Layer 2 Ethylene Vinyl-Acetate Copolymer | Thickness - 3.5 mils |
| Layer 3 Polyester | Thickness - 2.0 mils |
| Layer 4 Ethylene Vinyl-Acetate Copolymer | Thickness - 3.5 mils |
| Layer 5 Propylene Ethylene Copolymer | Thickness - 3.5 mils |

The structure above was biaxially oriented by the entrapped bubble technique at a temperature approximating the boiling point of water at a stretch ratio of about 4.8 to 1 in both the longitudinal and transverse directions. The compositions specified in Table II, which follows, included bisamide wax and mineral oil additions to all layers but with the diatomaceous earth addition to the skin (outer) layers only.

TABLE II

| Identifying Number | 0150 | 0162 | 0163 | 0164 | 0178 | 0179 | 0180 | 0181 | 0182 |
|---|---|---|---|---|---|---|---|---|---|
| Bisamide Wax ppm | 3000 | 3000 | 3000 | 3000 | 3000 | 3000 | 3000 | 4000 | 2000 |
| Mineral Oil ppm | 3000 | 2000 | 1000 | 500 | 3000 | 3000 | 4000 | 3000 | 3000 |
| Diatomaceous Earth (skin layers only) ppm | 1000 | 1000 | 1000 | 1000 | 1500 | 2000 | 1000 | 1000 | 1000 |
| Haze % | 1.8 | 1.6 | 1.6 | 1.6 | 2.4 | 2.8 | 1.9 | 2.1 | 2.2 |
| Total Transmission % | 92.3 | 92.5 | 92.5 | 92.4 | 92.1 | 92.1 | 92.3 | 92.3 | 92.4 |
| Clarity % | 81.4 | 81.9 | 80.7 | 82.8 | 79.3 | 80.6 | 81.8 | 81.6 | 81.3 |
| Gloss % | 92 | 93 | 92 | 95 | 91 | 91 | 92 | 91 | 92 |
| Gauge (mils) | .81 | .81 | .78 | .84 | .86 | .93 | .82 | .90 | .82 |
| COF | | | | | | | | | |
| Static in/in | .835 | .992 | .350 | 1.900 | .604 | .636 | .936 | .777 | .584 |
| out/out | .694 | 1.162 | .479 | .718 | .666 | .680 | .725 | .634 | .756 |
| Kinetic in/in | .580 | .500 | .310 | BL. | .440 | .490 | .522 | .475 | .485 |
| out/out | .500 | .495 | .432 | .435 | .462 | .515 | .492 | .440 | .495 |

The concentrations utilized in this example are for purposes of optimumization within the preferred ranges. Within the ranges tested, the mineral oil and wax additives have essentially no detrimental effect. Increasing the silica content does, however, lead to a deterioration in terms of haze. Increasing and decreasing the wax concentration slightly lowers the coefficient of friction. Variations in the mineral oil concentration cause a significant reduction in the coefficient of friction at the 1000 ppm level as compared to the 500 ppm level. Upon lowering the concentration to 500 ppm, blocking and high coefficient of friction values are encountered. The criticality of utilizing a plasticizing oil in combination with the slip and anti-block additives is illustrated by this example.

It is thus seen, as set forth above, that the process and additives of this invention produce a superior product possessing desirable slip and block characteristics while also possessing desirable optical characteristics. While many details of the invention are specified above, such details are of an exemplitive and nonlimiting nature. The spirit and scope of the subject invention is to be limited only as set forth in the following claims.

What is claimed is:

1. A polyolefin, thermoplastic packaging film having an improved combination of slip, block, and optical properties comprising:
   (a) 500 to 5,000 ppm by weight of a particulate antiblock agent selected from the group consisting of: colloidal silica, diatomaceous earth, clays, aluminum oxide, calcium oxide, magnesium oxide, barium oxide, titanium dioxide, iron oxide, zinc oxide, tin oxide, calcium carbonate, magnesium carbonate, mica, asbestos, calcium silicate, molybdenum disulfide, and zinc sulfide;
   (b) 500 to 8000 ppm by weight of a bisamide wax as a slip agent; and
   (c) 250 to 40,000 ppm by weight of a plasticizing oil selected from the group consisting of dibutyl sebacate, di-isododecyl phthalate, zinc stearate, stearic acid, polyethylene glycol monostearate, polyethylene glycol distearate, epoxidized vegetable oil, tricresyl phosphate, petroleum oil, parafin oil, tall oil, linseed oil, and liquid petrolatum.
   (d) the coefficient of friction of said film being substantially less than said film containing only said antiblock and slip agents alone or in combination.

2. The film of claim 1 wherein said plasticizing oil is liquid petrolatum.

3. The film of claim 1 wherein said plasticizing oil is heavy mineral oil.

4. A polyolefin, thermoplastic packaging film having an improved combination of slip, block, and optical properties comprising:
   (a) 1000 to 2000 ppm by weight of a particulate antiblock agent selected from the group consisting of: colloidal silica, diatomaceous earth, clays, aluminum oxide, calcium oxide, magnesium oxide, barium oxide, titanium dioxide, iron oxide, zinc oxide, tin oxide, calcium carbonate, magnesium carbonate, mica, asbestos, calcium silicate, molybdenum disulfide, and zinc sulfide;
   (b) 1000 to 3000 ppm by weight of a bisamide wax as a slip agent; and
   (c) 1000 to 3000 ppm by weight of a plasticizing oil selected from the group consisting of dibutyl sebacate, di-isododecyl phthalate, zinc stearate, stearic acid, polyethylene glycol monostearate, polyethylene glycol distearate, epoxidized vegetable oil, tricresyl phosphate, petroleum oil, paraffin oil, tall oil, linseed oil, and liquid petroleum;
   (d) the coefficient of friction of said film being substantially less than said film containing only said antiblock and slip agents alone or in combination.

5. The film of claim 4 wherein said plasticizing oil is liquid petrolatum.

6. In the process of making a polyolefin, thermoplastic packaging film having a lowered coefficient of friction by including:

from 500 to 8,000 ppm, by weight, of bisamide wax slip agent; and from 500 to 5,000 ppm, by weight of antiblock agents selected from the group consisting of:

colloidal silica, diatomaceous earth, clays, aluminum oxide, calcium oxide, magnesium oxide, barium oxide, titanium dioxide, iron oxide, zinc oxide, tin oxide, calcium carbonate, magnesium carbonate, mica, asbestos, calcium silicate, molybdenum disulfide and zinc sulfide;

in said film, the improvement comprising:

adding from 250 to 40,000 ppm, by weight, of a plasticizing oil selected from the group consisting of:

dibutyl sebacate, di-isododecyl phthalate, zinc stearate, stearic acid, polyethylene glycol distearate, epoxidized vegetable oil, tricresyl phosphate, petroleum oil, paraffin oil, tall oil, linseed oil, and liquid petrolatum; to the film composition thereby reducing the coefficient of friction substantially below that of the film containing slip or antiblock agents alone or in combination.

7. The process of claim 6 wherein the plasticizing oil is a heavy mineral oil.

8. In the process of making a polyolefin, thermoplastic packaging film having a lowered coefficient of friction by including:

from 1000 to 3000 ppm, by weight, of bisamide wax slip agent; and from 1000 to 2000 ppm, by weight of antiblock agents selected from the group consisting of:

colloidal silica, diatomaceous earth, clays, aluminum oxide, calcium oxide, magnesium oxide, barium oxide, titanium dioxide, iron oxide, zinc oxide, tin oxide, calcium carbonate, magnesium carbonate, mica, asbestos, calcium silicate, molybdenum disulfide and zinc sulfide; in said film, the improvement comprising:

adding from 1000 to 3000 ppm, by weight, of a plasticizing oil selected from the group consisting of:

dibutyl sebacate, di-isododecyl phthalate, zinc stearate, stearic acid, polyethylene glycol distearate, epoxidized vegetable oil, tricresyl phosphate, petroleum oil, paraffin oil, tall oil, linseed oil, and liquid petrolatum; to the film composition thereby reducing the coefficient of friction substantially below that of the film containing slip or antiblock agents alone or in combination.

9. The process of claim 8 wherein the plasticizing oil is a heavy mineral oil.

* * * * *